(12) United States Patent
Schmitz et al.

(10) Patent No.: US 8,494,824 B2
(45) Date of Patent: Jul. 23, 2013

(54) METHODS AND APPARATUS FOR INTEGRATING ENGINEERING MODELS FROM DISPARATE TOOLS IN SUPPORT OF MODEL REUSE

(75) Inventors: Jeffrey A. Schmitz, St. Charles, MO (US); Timothy J. Wilmering, Chesterfield, MO (US)

(73) Assignee: The Boeing Company, Chicago, IL (US)

( * ) Notice: Subject to any disclaimer, the term of this patent is extended or adjusted under 35 U.S.C. 154(b) by 667 days.

(21) Appl. No.: 12/371,858

(22) Filed: Feb. 16, 2009

(65) Prior Publication Data

US 2010/0211936 A1     Aug. 19, 2010

(51) Int. Cl.
     *G06G 7/48*      (2006.01)
(52) U.S. Cl.
     USPC .......................................................... 703/6
(58) Field of Classification Search
     USPC .......................................................... 703/6
     See application file for complete search history.

(56) References Cited

U.S. PATENT DOCUMENTS

2008/0228521 A1    9/2008   Wilmering et al.

OTHER PUBLICATIONS

Wilmering et al.; Semantic Requirements on Information Integration for Diagnostic Maturation; AUTOTESTCON Proceedings, 2001 IEEE Systems Readiness Technology Conference; pp. 793-807; 2001.*
Wilmering, T. 2003. When Good Diagnostics Go Bad—Why Maturation is Still Hard. Proceedings of the IEEE Aerospace Conference, Big Sky, MT. pp. 1-11.*
Bodkin et al.: Use of Ontologies for Decision Support Generation and Analysis; pp. 684-689; IEEE Autotestcon proceedings, Sep. 2005.*
Molina et al.; Enterprise Integration and Networking: challenges and trends; published in Studies in Informatics and Control 16, 4 (2007) 353-368.*
Ofsthun et al.: Model-Driven Development of Integrated Health Management Architectures; 2004 IEEE Aerospace Conference Proceedings; pp. 1-14.*
Rasmussen, R. et al.; Semantic Data integration for Situational Information in the Military Domain; 2008 Semantic Technology Conference; May 18-22, 2008; 14 pages; Semantic Universe; San Jose, CA.

* cited by examiner

*Primary Examiner* — Hugh Jones
(74) *Attorney, Agent, or Firm* — Armstrong Teasdale, LLP

(57) ABSTRACT

A computer system having stored in memory a set of executable software tools that include both producer tools and consumer tools, wherein one or more of the tools may be both a producer tool and a consumer tool, a model repository, and a set of software engines that include hybrid models each bridging semantics of a corresponding producer tool or a corresponding consumer tool that is importing or exporting to or from a neutral model representation of the information, wherein instantiations of the neutral models reside in the model repository.

21 Claims, 6 Drawing Sheets

METHODS AND APPARATUS FOR INTEGRATING ENGINEERING MODELS FROM DISPARATE TOOLS IN SUPPORT OF MODEL REUSE

BACKGROUND OF THE INVENTION

The field of the invention relates generally methods and apparatus for integrating model data from native tool formats into a common semantic representation, and more particularly such methods and applications that allow sharing of models between disparate engineering tools.

Improved performance of real time Health Management (HM) and maintenance functions is becoming a primary design goal of complex systems. Legacy approaches to system design, which focused primarily on minimizing initial acquisition costs, have been generally inadequate to address availability-driven design. While tools that support availability modeling are not new, traditional acquisition processes have not generally emphasized their importance, and attempts to include availability as a primary design metric have often been met with resistance.

A common way to represent system behavior is to create a model of that behavior. Modeling approaches vary considerably—their usefulness is proportional to the degree to which they can represent interesting aspects of system behavior in a way that reduces or abstracts the complexities of collateral behavior. There are many categories of models; mental, physical, verbal, etc. In engineering applications, both qualitative (descriptive) and quantitative (mathematical) models, which may take various forms (e.g., text, spreadsheets, graphical representations, static or dynamic networks, etc.), are often employed. In general, models support analyses of important aspects of system behavior and enable dynamic views of that behavior via calculation, visualization, simulation, etc. Correctly designed models allow engineers and analysts to draw conclusions and predictions of system behavior in ways otherwise unattainable, as well as to represent their own knowledge of the system and its characteristic properties.

Integrated Vehicle Health Management (IVHM) is a technology and process that allows operators to move from maintenance action to management by providing intelligent decision support re system operational responsiveness. IVHM also improves turnaround time through more accurate and timely fault reporting, simplified diagnostics, and efficient, proactive management of repairs. IVHM may also reduce preventative maintenance and inspections, improve safety, and increase the user's confidence in system reliability. The result is a safer, more affordable system with increased availability.

IVHM systems usually comprise a plurality of modeling, analysis, and reasoning tools to represent a system such as, for example, an aircraft. Certain modeling tools may have a closely coupled diagnostic reasoner. However, costs associated with IVHM application development are high because of inherent synchronization problems of concurrently maintaining different configurations of these models within each engineering application, i.e., independent copies of models that contain a large amount of overlapping data.

So, even in cases where direct information exchange between tools may be attempted, such closely coupled approaches to model exchange as described above suffer from several limitations:

1. Semantic rules and consistency must be guaranteed at the exchange level and maintained at the processing level by "hard-wiring" connections into the body of the code that performs the information exchange and processing. Such an approach is extremely brittle to errors in assumptions or changes in the information and specific application formats to be shared between interoperating applications. If errors or changes occur, it requires a significant effort to analyze and incorporate the ramifications of these anomalies into the translation process.

2. Developing translators for each pair of tools that need to share data can result in the creation and maintenance of $O(n^2)$ translators.

3. Pair-wise tool coupling does not support the cumulative knowledge creation effect of multiple tools contributing to a single integrated model of engineering knowledge.

Typically, code based translations have to take into account data format and syntactic issues as well as required "semantic" transforms to correctly translate information from one application to another. Inter-mixing the logic for the syntactical, data format translations with that required semantic transformations between two information sources make the transforms more difficult to create, prone to error in development, and brittle to maintain.

BRIEF DESCRIPTION OF THE INVENTION

One aspect of the present disclosure provides a computer system having stored in memory a set of executable software tools that include both producer tools and consumer tools, wherein one or more of the tools may be both a producer tool and a consumer tool, a model repository, and a set of software engines that include hybrid models each bridging semantics of a corresponding producer tool or a corresponding consumer tool to those of a neutral model, wherein the neutral models reside in the model repository.

Another aspect of the present disclosure provides a method for integrating engineering models from disparate tools in support of model reuse. The method is performed using an apparatus that includes a computer system having stored in memory a set of executable software tools including both producer tools and consumer tools, wherein one or more of the included tools may be both a producer tool and a consumer tool, a model repository, and a set of software engines that include hybrid models, each bridging semantics of a corresponding producer tool or a corresponding consumer tool that is importing or exporting an instantiated neutral model, wherein the instantiated neutral models reside in the model repository. The method includes using a software engine to provide a transformation from a producer application model to a neutral model, and using a software engine to provide a transformation from a neutral model to a consumer application model.

Yet another aspect of the present disclosure provides a computer-readable medium or media, such as a magnetic or optical disk, or non-volatile RAM or ROM, or some combination thereof. The computer-readable medium or media have recorded thereon a set of computer-executable software tools comprising both producer tools and consumer tools, wherein one or more said tools may be both a producer tool and a consumer tool, a model repository, and a set of software engines that include hybrid models, each bridging semantics of a corresponding producer tool or a corresponding consumer tool that is importing or exporting an instantiated neutral model. The computer-readable medium or media further have recorded thereon instructions configured to instruct the computer to use a software engine to provide a transformation from a producer application model to a neutral model, and to use a software engine to provide a transformation from a neutral model to a consumer application model.

Various embodiments of the present disclosure will be seen to reduce development cost, provide higher fidelity health management application development, and enhance lifecycle support.

DETAILED DESCRIPTION OF THE INVENTION

An understanding of the following two W3C standards will be found useful in aiding understanding as they are utilized extensively in some embodiments of the present disclosure: (1) W3C Web Ontology Language (OWL)—http://www.w3.org/TR/owl-features/, and SPARQL Query Language for RDF—http://www.w3.org/TR/rdf-sparql-query/. In addition, IEEE 1232 AI-ESTATE is referenced herein.

Some embodiments of the present disclosure provide a semantic engine for integrating engineering models from disparate tools in support of model reuse and knowledge capture. Advantages of information and model reuse accrue to reduce costs associated with health management application development. Technical effects of embodiments of the present disclosure include reducing or eliminating inherent synchronization problems of concurrently maintaining different configurations of these models within each engineering application, i.e., independent copies of models that contain a large amount of overlapping data.

Figure 1:
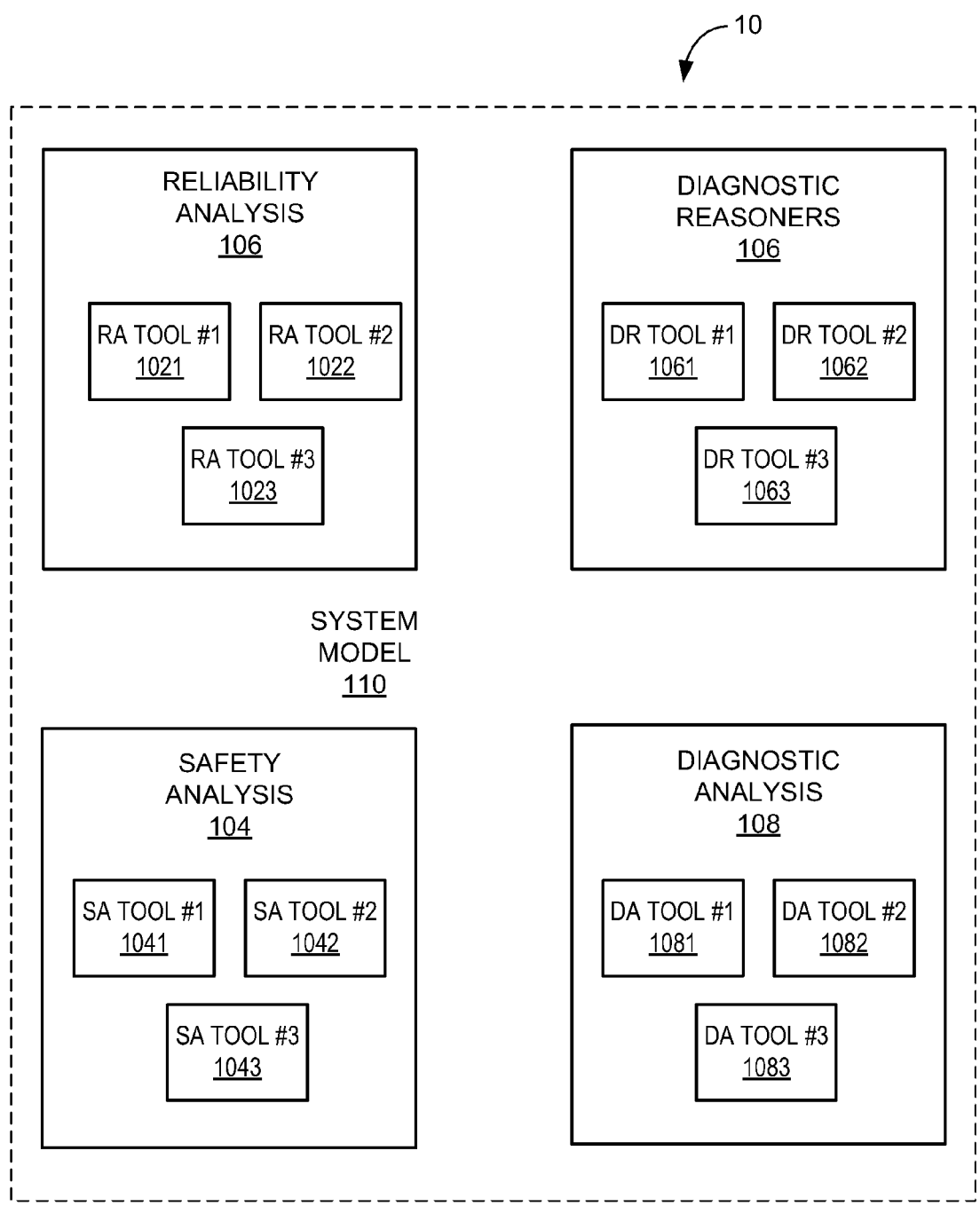
FIG. 1 is a diagram of a system which can be referred to as a collection of interacting tools.

Referring to FIG. 1, at a high level, a system 10 in some embodiments of the present disclosure can be viewed as a collection of interacting tools 1021, 1022, 1023, 1041, 1042, 1043, 1061, 1062, 1063, 1081, 1082, and 1083 that are roughly categorized into reliability analysis (RA) 102, safety analysis (SA) 104, diagnostic analysis (DA) 108, and diagnostic reasoning (DR) 106 tools. Tools 1021, 1022, 1023, 1041, 1042, 1043, 1061, 1062, 1063, 1081, 1082, and 1083 are software modules or programs in a machine-readable memory that run or can be run on either a single computer or workstation or on different, and possibly networked, computers or workstations. It is not necessary that all tools be run at the same time. In addition, the machine-readable memory can reside in a database or fileserver in some embodiments of the present disclosure. The quantity of tools shown in FIG. 1 has been selected only to provide a non-trivial example of a system 10 and should not be regarded as limiting any particular embodiment. In fact, the number of tools in each category can differ from the three shown, and the number of tools in each category need not be the same.

Figure 2:
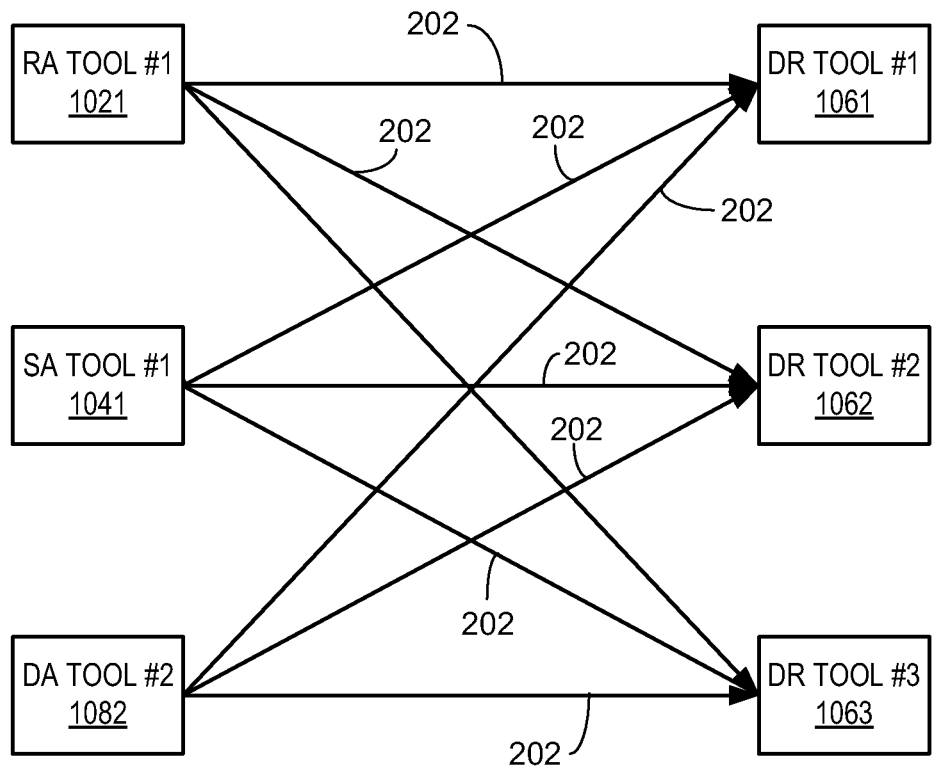
FIG. 2 is a diagram illustrating closely coupled (point to point) relationships between several tools.

Each of the tools 1021, 1022, 1023, 1041, 1042, 1043, 1061, 1062, 1063, 1081, 1082, and 1083 may be considered a companion tool to the other tools in system 10. For example, and referring to prior art FIG. 2, tool 1062 may be the companion tool for tool 1041. One tool in a set of two companion tools may build models, (e.g., a producer tool), and the other tool, (e.g., a consumer tool) may do some intelligent reasoning on those models or further addition of system knowledge due to its unique modeling perspective. The tools within box 110 of FIG. 1 include tools that share data with another tool. Diagnostic reasoners also contribute knowledge to the model repository. By creating cross couplings 202 of every "producer tool" (1021, 1041, 1082) with every "consumer tool" (1061, 1062, 1063), these tools can effectively share information. The sharing is at a price, however, as $O(n^2)$ couplings 202 (some of which are shown in FIG. 2) must be created and maintained.

Figure 3:
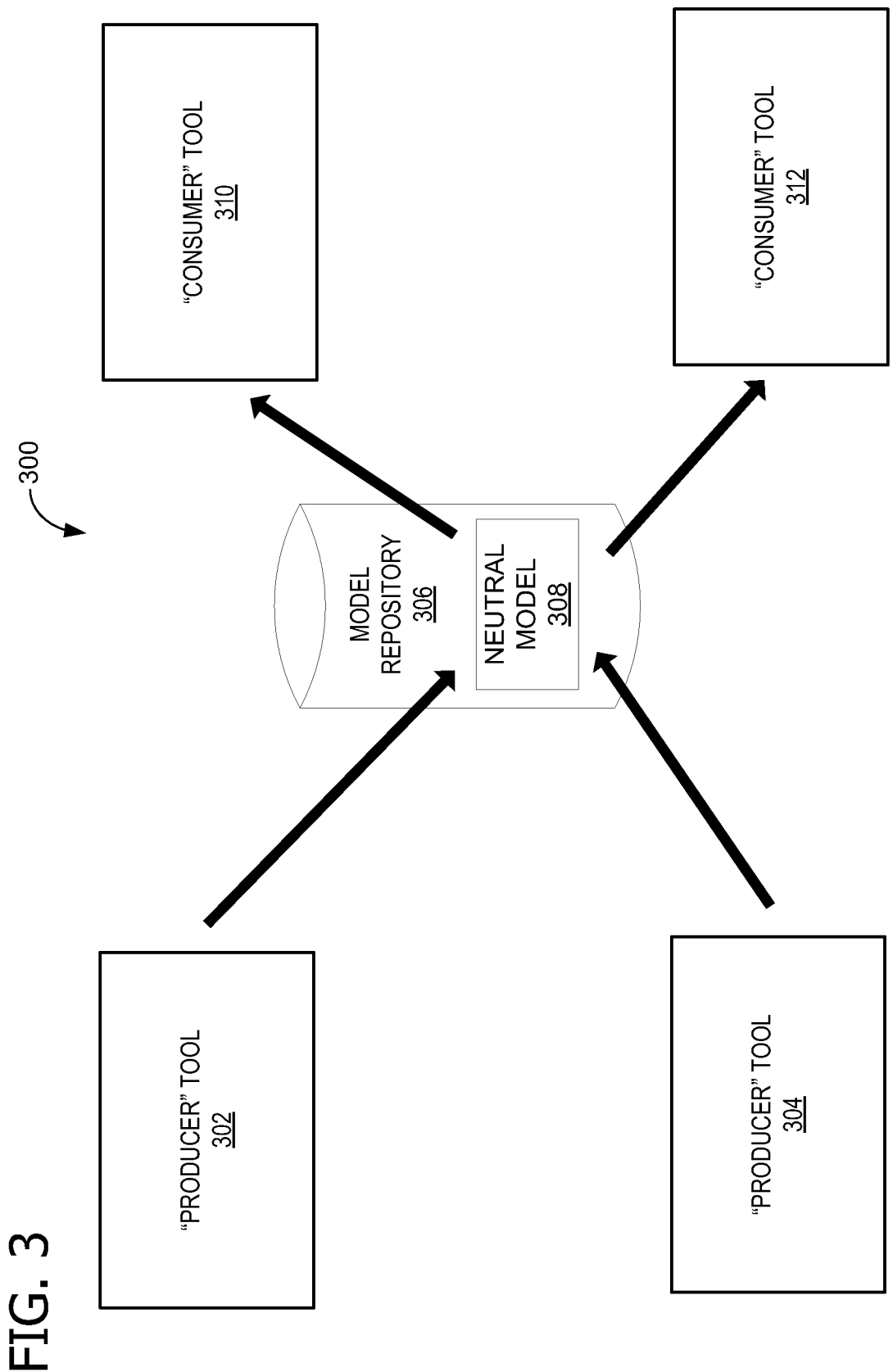
FIG. 3 is a diagram of a semantic integration engine used to support a model integration framework.

Referring to FIG. 3, a semantic integration engine is used in embodiments of the present disclosure to support a model integration framework (MIF) 300 running thereon. At the center of MIF 300 is a model repository 306 that is all or part of a data base running on a local or networked computer or workstation. Model repository 306 includes a plurality of instantiations of the neutral models 308. A neutral model 308 is an ontological object comprising a data structure stored in a memory that allows the terms and concepts of some domain (for example and not by way of limitation, an IVHM) to be expressed. An instantiation of the neutral model is literally one or more "instances" of data that reifies each term or concept represented in the neutral model. In some embodiments of the present disclosure, an ontology is expressed in standard W3C OWL (Web Ontology Language), but other standard ontology languages can be used in other embodiments or for domains other than HM applications. The information in an ontology is based on an IEEE STD 1232-2002 AI-ESTATE model in some embodiments, but other models may be used in other embodiments. The model itself is not considered to be critical to the invention, but it is part of the architecture of the embodiment. In the embodiment illustrated in FIG. 3, only two producer tools and only two consumer tools are shown by way of example. In general, there may be as many producer tools and consumer tools as needed in any given embodiment, and the number of producer tools and the number of consumer tools do not have to be equal, and any single tool may play both a producer and a consumer role at different times.

A "hub and spokes" architecture is used for MIF 300 in many embodiments. MIF 300 is used to transmit information from tools such as producer tools 302 and 304 (which may be, for example, any of tools 1021, 1022, 1023, 1041, 1042, 1043, 1081, 1082, and/or 1083 that produce information) into a model repository 306, translated by a computer or workstation into information that syntactically and semantically conforms to the specification of a neutral model 308. A consuming tool can access (e.g., query) the neutral model 308 in model repository 306 to obtain information therein. A consuming tool 310 or 312 can do this because a standard ontological language format is used for storing of the information of the producing tool.

Thus, the drawing of FIG. 3 is a generic representation of a part of an embodiment of a MIF 300 of this disclosure. In some embodiments, there is at least one tool available that represents a model as a part with failure modes and a test of those failure modes as well as at least one other tool which represents a different model of the same system. Domain experts are able to map the terms from one model to the neutral model in the center of the architecture, and do the same for the other model, allowing for an understanding of the relationships between components in the model and the sharing of information between the tools.

Figure 4:
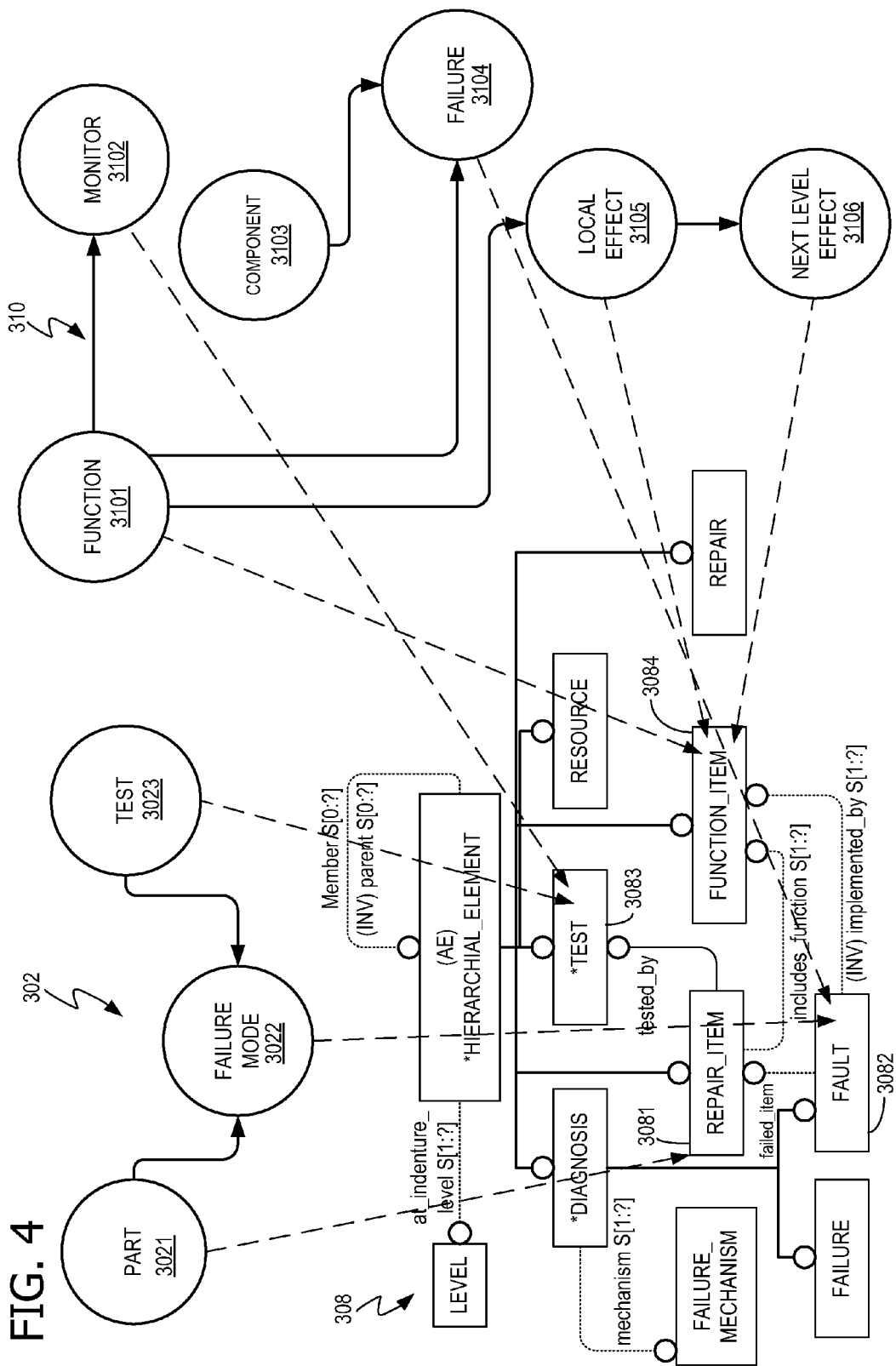
FIG. 4 illustrates mapping of a producer tool model and a consumer tool 310 model to a neutral model.

An example of such a mapping is shown in FIG. 4. In this example, components of a producer tool 302 model and a consumer tool 310 model are mapped to a neutral model 308. The mapping of the components in FIG. 4 is listed in Table 1.

TABLE I

| Model Component | is mapped to Model Component |
|---|---|
| 3021 (part) | 3081 (repair item) |
| 3022 (failure mode) | 3082 (fault) |
| 3023 (test) | 3083 (test) |
| 3101 (function) | 3084 (function) |
| 3102 (monitor) | 3083 (test) |
| 3103 (component) | 3081 (repair item) |
| 3104 (failure) | 3082 (fault) |
| 3105 (local effect) | 3084 (function) |
| 3106 (next level effect) | 3084 (function) |

FIG. 4 shows the data flow and intermediate data representations of the data as information is transformed from the native format of a producer tool into the neutral model and back out of the neutral model into the native format of a consumer tool. On the left side of the diagram, the process initiates with a file that represents the model to be transformed in the producer tool native file format. The first transformation is simply a syntactical transformation to change the native file format into a producer tool application model format. There are no "semantic" transformations applied during this transform, thus the mappings in Table 1 do not apply at this time. As an example, parts 3021 remain parts and failure modes 3023 remain failure modes. Once in the application model format, the second transform is applied, mapping the concepts in the application OWL model into the concepts defined in the neutral model. It is at this point that the mappings in Table 1 are effected.

The process is reversed when the neutral model to consumer tool native file format mappings are attempted. The mappings described in Table 1 are effected, this time going from column 2 to column 1. The syntactic transform is then applied to transform the application model format into the consumer tool native file format.

Figure 5:
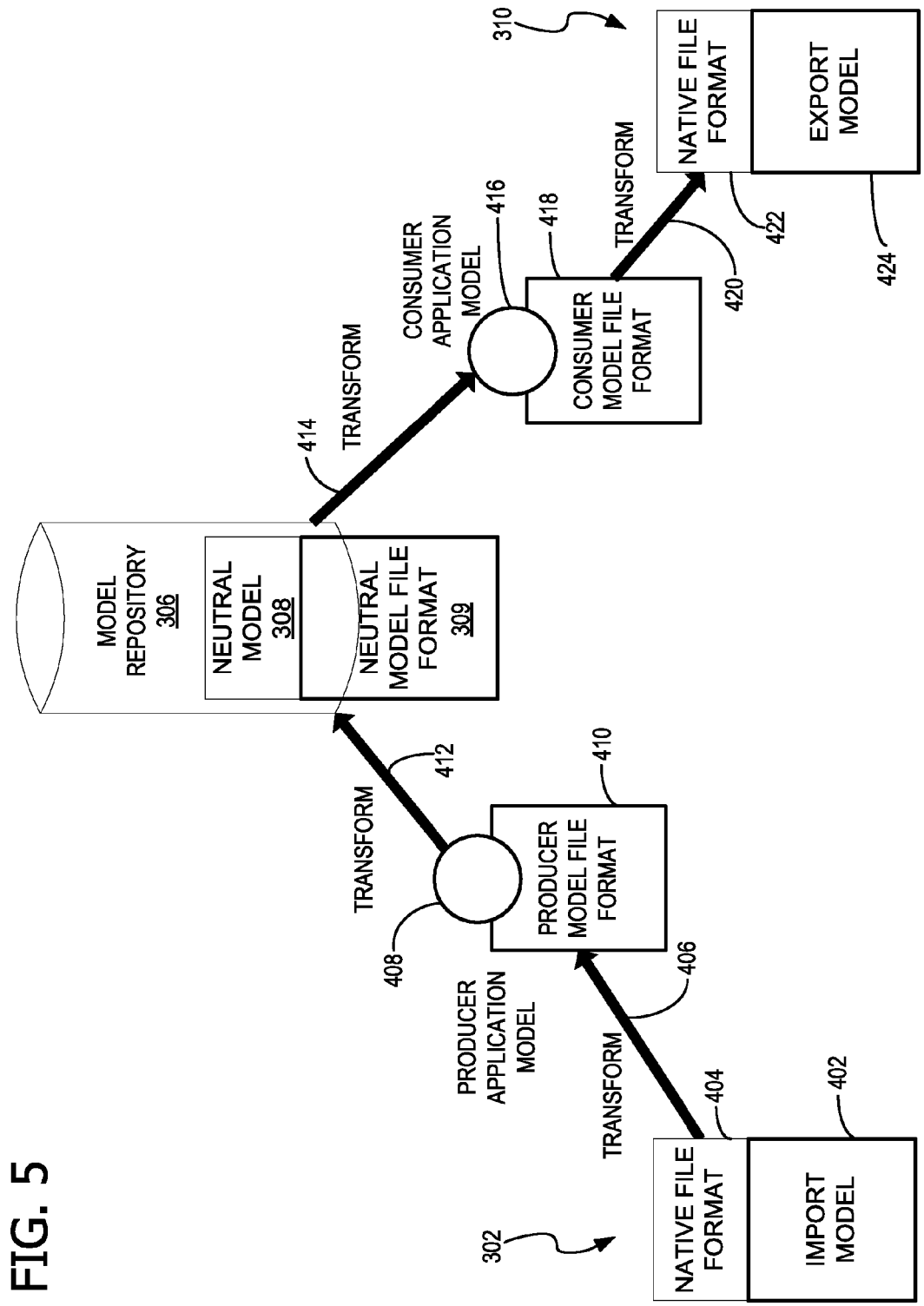
FIG. 5 diagrams a model repository and run-time transforms performed in the memory of a computer, workstation, or server.

Referring to FIG. 5, a model repository 306 is provided in memory of a computer, workstation, or server. In the same or another computer or workstation, a producer tool 302 produces an import model 402 having a native file format 404. Model 402 is imported from producer tool 302 into model repository 306 and exported as a different model 424 in its own native file format 422 to a consumer tool 310 running on a computer or workstation, which may but need not be the same computer or workstation running producer tool 302. To accomplish this task, application models 408 and 416 are created for the producer tool 302 and the consumer tool 310, respectively. The same is done for each producer tool and consumer tool, as needed, and the application model for a given tool may be used for both import and export with respect to that tool. Application models 408 and 416 each have their own file format 410 and 418, respectively, and each of the tools 302 and 310 has its own file format 404 and 422, respectively. Neutral Model 308 also has its own file format 309. Different producer tools, in general, will each have their own import models and native file formats, as will different consumer tools. In this regard, there really is no distinction between producer tools and consumer tools as each tool generally has its own file format used for both import and export.

Code for the transformations 406, 412, 414, and 420 is written and executed to transfer models from format to format to match both the syntax and semantics of the model into the next stage of the transformation process. These transformations allow not only the movement of data, but the movement of the meaning of the data. The meaning inherent in the models is preserved as the data goes from model to model. Because model information is preserved, the model can be expanded upon by the next tool or tools in a tool chain to add power to the model.

Figure 6:
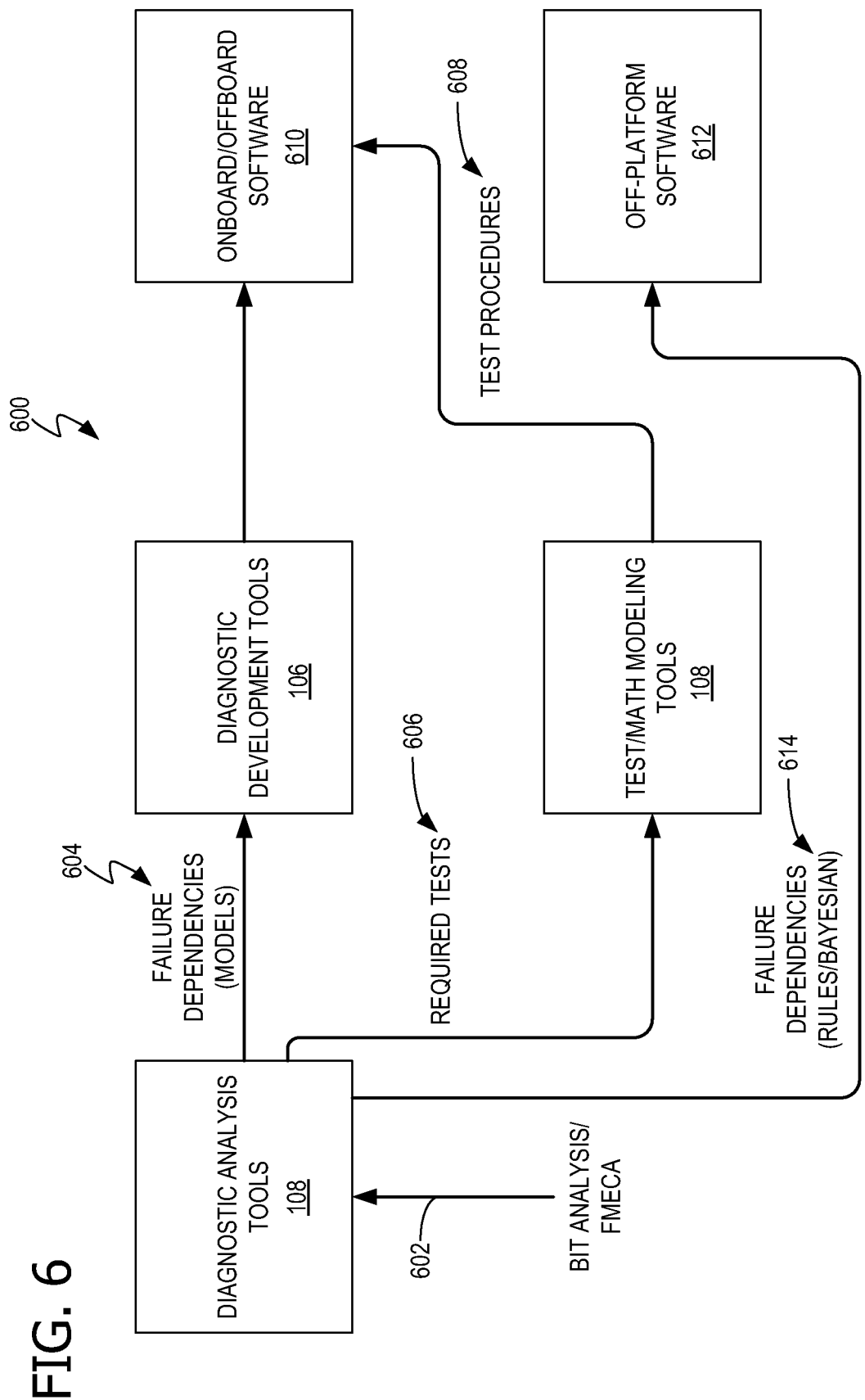
FIG. 6 illustrates one embodiment of a model integration framework (MIF) data flow.

Referring to FIG. 6, a representative model integration framework (MIF) data flow 600 is shown. Suppliers supply a built-in test (BIT) analysis or a Failure Modes and Effects and Criticality Analysis (FMECA) 602 that is input to one or more diagnostic analysis tools 108. A diagnostic analysis is performed by these tools to determine how components 3021 may fail and which tests might detect those failures. The results of these analyses are failure dependency models 604 that are exported from the diagnostic analysis tools 108, and sent through the framework of FIG. 5 and then exported to the next tool in the chain, which in this case is one or more diagnostic development (diagnostic reasoning 106) tools. Examples of these diagnostic development tools are computer test strategy authoring tools and tools that create graphical cause and effect models. These cause and effect models permit one to determine the underlying causes when a diagnostic test fails. Also, the diagnostic analysis tools 108, in some embodiments, output a list of one or more required tests 606 to test and mathematical modeling tools 108 that allow one to create tests by modeling and simulating systems and that allow one to understand the physics of the failures. The test procedures 608 created can be executed on onboard and/or offboard software 610. Also, in some embodiments of the present disclosure, diagnostic development tools 106 and simulation tools 108 are capable of creating autocode, which can be used to create code that can be executed onboard or offboard, for example a vehicle, to both monitor systems for failures and isolate those failures to their components. A diagnosis is then sent off of the platform to supplemental support systems. Diagnostic analysis tools 108 are also capable of sending failure dependencies to off-platform software 612 in some embodiments, to aid in supplemental tests and analysis.

In summary, various embodiments of the present disclosure provide a computer system 10 having stored in memory a set of executable software tools 1021, 1022, 1023, 1041, 1042, 1043, 1061, 1062, 1063, 1081, 1082 and 1083 comprising both producer tools 302 and consumer tools 310, wherein one or more of the tools may be both a producer tool and a consumer tool, a model repository 306, and a set of software engines 406, 412, 414, and 420 that comprise hybrid models, each bridging semantics of a corresponding said producer tool or a corresponding said consumer tool that is importing or exporting a neutral model 308, wherein the neutral models reside in the model repository. The software engines execute the transformations shown in FIG. 5. In certain embodiments, "scripts", which are bits of software code are executed by the software engines, for each of the "transforms".

In some of these embodiments, the computer system further includes software engines 406, 420 configured to provide transformation to or from a producer application model 408 and file format 410 or transformation to or from a consumer application model 416 and file format 418. Also, some embodiments have software engines configured to store, in a neutral model, information from the tools not common across a domain, but which must be retained to facilitate future imports or exports of information to or from an originating said tool. In other words, model 308 can be a general model that holds information not necessarily belonging to all models such as models 302 and 310. In addition, some embodiments may be in the form of a computer system that includes a plurality of networked computers or workstations and in which the model repository resides on a server.

In some embodiments, the neutral models are expressed in W3C OWL web ontology language and/or may be in accordance with IEEE STD 1232-2002 AI-ESTATE models. The producer tools and consumer tools may include tools relating to vehicle health management, and the producer tools and consumer tools may include tools from one or more of the following types of tools: reliability analysis tools, safety analysis tools, diagnostic analysis tools, and diagnostic reasoning tools. However, additional tool types are contemplated.

Other embodiments of the present disclosure provide a method for integrating engineering models from disparate tools in support of model reuse. The method is performed using an apparatus that includes a computer system having stored in memory a set of executable software tools including both producer tools and consumer tools, wherein one or more of the included tools may be both a producer tool and a consumer tool, a model repository, and a set of software engines that include hybrid models, each bridging semantics of a corresponding a producer tool or a corresponding consumer tool that is importing or exporting a neutral model, wherein the instantiations of the neutral models reside in the model repository. The method includes using a software engine and software scripts to provide a transformation from a producer application model to a neutral model, and using a software engine and software scripts to provide a transformation from a neutral model to a consumer application model.

In some embodiments, the method further includes using a software engine configured to store, in a repository based on a neutral model, information from the tools not common across a domain, but which must be retained to facilitate future imports or exports of information to or from an originating the tool. Also in some embodiments, the method is performed on a computer system that includes a plurality of networked computers or workstations and in which the model repository resides on a server. The neutral models can be expressed in W3C OWL web ontology language and/or based on IEEE STD 1232-2002 AI-ESTATE models. In some embodiments, the producer tools and consumer tools include tools relating to vehicle health management. Also in some embodiments, the producer tools and consumer tools include one or more tools selected from the group consisting of reliability analysis tools, safety analysis tools, diagnostic analysis tools, and diagnostic reasoning tools. The list of tools should not be considered limiting as other tools are contemplated.

Some embodiments of the present disclosure provide a computer-readable medium or media, such as a magnetic or optical disk, or non-volatile RAM or ROM, or some combination thereof. The computer-readable medium or media have recorded thereon a set of computer-executable software tools comprising both producer tools and consumer tools, wherein one or more said tools may be both a producer tool and a consumer tool, a model repository, and a set of software engines that include hybrid models, each bridging semantics of a corresponding producer tool or a corresponding consumer tool that is importing or exporting a neutral model. The computer-readable medium or media further have recorded thereon instructions configured to instruct the computer to use a software engine to provide a transformation from a producer application model to a neutral model, and to use a software engine to provide a transformation from a neutral model to a consumer application model.

Some embodiments of medium or media in accordance with the present disclosure further include instructions to instruct the computer to use a software engine configured to store, in a neutral model format, information from the tools not common across a domain, but which must be retained for future imports or exports of information to or from an originating tool. Also, in some embodiments, the neutral models are expressed in W3C OWL web ontology language. Further, in some embodiments, the producer tools and consumer tools include tools relating to vehicle health management.

It will be understood that a typical embodiment of the present disclosure may use about three or four different tools from FIG. 1 for a job to be performed in a tool chain, even though illustrated tool chains show only two steps. In fact, some tool chains are much longer. For any two tools, if, for example, there are four tools that can do one job and four tools that can do the next job, transforms must be written for each tool to every other tool in prior art embodiments. Thus, sixteen transforms have to be written specifically written to support one stage of the chain. These sixteen transforms have to maintained and understood, and when changes are made, the changes likely have to be made in all sixteen transforms. By using a neutral model as in embodiments of the present disclosure, the number of transforms that must be written can be reduced to 2×4=8 transforms.

Developing translators for each pair of tools that need to share data can result in the creation and maintenance of $O(n^2)$ translators. Using a centralized, loosely coupled approach requires at the most $O(2n)$ translators (where n=number of applications sharing data), thereby greatly reducing the degree of effort to create and maintain the necessary translation capability.

The semantic integration approach of the present disclosure provides a domain model that can be developed over a long period of time by a number of experts. The domain model thus can represent a very rich picture and understanding of the semantics of a domain. Domain experts create interim models which represent the semantics of the tools. All the semantics are represented within these models and transformations do not have to deal with representing meaning, but rather only the mechanics of making the transformations from model to model. As the understanding of the tools and processes increases, the models themselves can be enriched in terms of their meaning without having to adjust or rewrite all of the transforms. Thus, a much more robust system is provided with understandable and repeatable process that gives, in the long run, more accurate results. Use of MIF Semantic Engines will provide significant cost savings over traditional methods of health management development solutions.

Using the MIF framework and a semantic modeling approach allows the syntactic data format issues to be handled separately from the required semantic transformations. This separation of concerns supports focus on syntax issues for the first set of transforms, and then during development of the semantic transforms, developers are able to concentrate on the purely semantic differences between to application's information models. Furthermore, by using an architecture where each application has its own representative model in the framework, the data format issues that do need to be handled are localized (increasing maintainability) as well as greatly simplified since the translation only has to translate the application data into a semantic model that is based both structurally and semantically based on the data format itself, making this "data to application model" translation a very simple syntactic translation. The semantic transforms from Application Model to Neutral Model are then so similar in nature as to be "almost" trivial from tool to tool.

Also, embodiments of the present disclosure allow legacy applications that have no inherent knowledge of each other to share models and information created within them. The framework can quickly adapt to new applications, without the applications themselves having to be modified. Changes to the applications are encapsulated to those applications, and minor modifications to the transform for that tool will need to be made, but interfaces to all other tools participating in the framework are unchanged. In addition, embodiments of the present disclosure allow information to be "built up" incrementally, and new knowledge to be discovered and used from the specific information provided by each application.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer system having stored in memory:
   a set of executable software tools comprising a producer tool and a consumer tool;
   a memory comprising a model repository that includes a plurality of instantiations of neutral models, wherein the neutral models are ontological objects that include data structures stored in the memory that enable terms and concepts of a domain to be expressed; and
   a set of software engines, the set of software engines transforming data from a native format of one of said producer tool or said consumer tool to a syntactic representation and a semantic representation of the data in a neutral model stored in the memory, the set of software engines further transforming the syntactic representation of the data to data in a native format of the other of said producer tool or said consumer tool, and after transforming the syntactic representation of the data to data in a native format, transforming the semantic representation of the data to data in a native format.

2. A computer system in accordance with claim 1 further having software engines and software scripts configured to provide transformation to or from a producer application model and file format or transformation to or from a consumer application model and file format.

3. A computer system in accordance with claim 1 further having software engines configured to store, in said model repository, information from said tools not common across a domain, but which are retained for future imports or exports of information to or from an originating said tool.

4. A computer system in accordance with claim 1 wherein the computer system comprises a plurality of networked computers or workstations and the model repository resides on a server.

5. A computer system in accordance with claim 1 wherein said neutral model is expressed in W3C OWL web ontology language.

6. A computer system in accordance with claim 1 wherein said neutral model is an IEEE STD 1232-2002 AI-ESTATE model.

7. A computer system in accordance with claim 6 wherein said neutral model is expressed in W3C OWL web ontology language.

8. A computer system in accordance with claim 1 wherein said producer tool and consumer tool comprise a plurality of modeling, analysis, and reasoning tools relating to vehicle health management.

9. A computer system in accordance with claim 8 wherein said producer tool and consumer tool include one or more tools selected from the group consisting of reliability analysis tools, safety analysis tools, diagnostic analysis tools, and diagnostic reasoning tools.

10. A method for integrating engineering models from disparate tools in support of model reuse, said method performed using an apparatus comprising a computer system having stored in memory a set of executable software tools comprising both producer tools and consumer tools, a model repository that includes a plurality of instantiations of neutral models, wherein the neutral models are ontological objects that include data structures stored in the memory that enable terms and concepts of a domain to be expressed, and a set of software engines, said method comprising:
    receiving, by a processor, from one of a producer tool or a consumer tool, data in a native format of the one of the producer tool or the consumer tool;
    using a first software engine from the set of software engines, transforming the data in the native format to a syntactic representation of the data in a neutral model stored in the memory;
    after transforming the data in the native format to a syntactic representation of the data in a neutral model, using the first software engine from the set of software engines to transform the data in the native format to a semantic representation of the data in the neutral model stored in the memory; and
    using a second software engine from the set of software engines, transforming the syntactic representation of the data and then transforming the semantic representation of the data into data in a native format of the other of the producer tool or the consumer tool.

11. A method in accordance with claim 10 further comprising using a software engine configured to store, in a model repository whose interface is expressed as the neutral model, information from said tools not common across a domain, but which are retained for future imports or exports of information to or from an originating said tool.

12. A method in accordance with claim 10 wherein the computer system comprises a plurality of networked computers or workstations and the model repository resides on a server.

13. A method in accordance with claim 10 wherein said neutral model is expressed in W3C OWL web ontology language.

14. A method in accordance with claim 10 wherein said neutral model is an IEEE STD 1232-2002 AI-ESTATE model.

15. A method in accordance with claim 10 wherein said producer tool and consumer tool comprise a plurality of modeling, analysis, and reasoning tools relating to vehicle health management.

16. A method in accordance with claim 15 wherein said producer tool and consumer tool include one or more tools selected from the group consisting of reliability analysis tools, safety analysis tools, diagnostic analysis tools, and diagnostic reasoning tools.

17. A method in accordance with claim 10 wherein using a software engine comprises executing stored model transformation scripts.

18. A non-transitory computer-readable medium or media having recorded thereon a set of computer-executable software tools comprising both producer tools and consumer tools, and a set of software engines, said computer-readable medium or media further having recorded thereon instructions configured to instruct one or more processors to:

receive, from one of a producer tool or a consumer tool, data in a native format of the one of the producer tool or the consumer tool;

using a first software engine from the set of software engines, transform the data in the native format to a syntactic representation of the data in a neutral model stored in the memory;

after transforming the data in the native format to a syntactic representation of the data in a neutral model, using the first software engine from the set of software engines to transform the data in the native format to a semantic representation of the data in the neutral model stored in the memory; and using a second software engine from the set of software engines, transform the syntactic representation of the data and then transform the semantic representation of the data into data in a native format of the other of the producer tool or the consumer tool.

19. A non-transitory computer-readable medium or media in accordance with claim 18 further comprising instructions to instruct the one or more processors to use a software engine configured to store, in the model repository that contains instantiations of the neutral model, information from said tools not common across a domain, but which are retained for future imports or exports of information to or from an originating said tool.

20. A non-transitory computer-readable medium or media in accordance with claim 18 wherein said neutral model is expressed in W3C OWL web ontology language.

21. A non-transitory computer-readable medium or media in accordance with claim 18 wherein said producer tool and consumer tool comprise a plurality of modeling, analysis, and reasoning tools relating to vehicle health management.

\* \* \* \* \*